US012269428B2

(12) United States Patent
Kim et al.

(10) Patent No.: US 12,269,428 B2
(45) Date of Patent: Apr. 8, 2025

(54) ROTATING MULTI-VARIANT LUGGAGE TRAY STRUCTURE

(71) Applicants: HYUNDAI MOTOR COMPANY, Seoul (KR); KIA CORPORATION, Seoul (KR)

(72) Inventors: Ji Ah Kim, Seoul (KR); Min Ho Cho, Suwon-si (KR); Jin Ho Hwang, Cheonan-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 263 days.

(21) Appl. No.: 17/967,986

(22) Filed: Oct. 18, 2022

(65) Prior Publication Data

US 2023/0166663 A1 Jun. 1, 2023

(30) Foreign Application Priority Data

Nov. 30, 2021 (KR) .................. 10-2021-0168134

(51) Int. Cl.
*B60R 5/04* (2006.01)
*B60R 7/02* (2006.01)
*B60R 7/04* (2006.01)

(52) U.S. Cl.
CPC .............. *B60R 5/045* (2013.01); *B60R 5/048* (2013.01); *B60R 7/02* (2013.01); *B60R 7/046* (2013.01)

(58) Field of Classification Search
CPC .. B60R 5/045; B60R 7/02; B60R 5/04; B60R 5/044; B60R 2011/0036; B60R 2011/0082; B60R 5/046; B60R 5/047; B60R 5/048; B60R 2011/0019; B60R 2011/0024; B60R 7/046
USPC .............. 296/37.1, 37.5, 37.8, 37.13
See application file for complete search history.

(56) References Cited

U.S. PATENT DOCUMENTS

| | | | |
|---|---|---|---|
| 5,795,005 A * | 8/1998 | Garfias ................ | B60R 7/046 312/275 |
| 6,623,060 B2 * | 9/2003 | Gehring ................ | B60R 7/02 296/37.16 |
| 10,029,618 B2 * | 7/2018 | Perez Astudillo ...... | B60R 5/048 |
| 10,160,390 B2 | 12/2018 | Na | |
| 10,993,530 B2 | 5/2021 | Cass | |
| 11,167,695 B2 | 11/2021 | Lee et al. | |
| 11,433,824 B2 * | 9/2022 | Mandelbaum ............ | B60R 7/06 |
| 11,872,958 B2 * | 1/2024 | Tettenborn ................ | B60R 7/04 |

(Continued)

FOREIGN PATENT DOCUMENTS

| | | |
|---|---|---|
| EP | 1806262 A1 | 7/2007 |
| JP | 2013255539 A | 12/2013 |

(Continued)

*Primary Examiner* — Amy R Weisberg
*Assistant Examiner* — Denise L. Esquivel
(74) *Attorney, Agent, or Firm* — Lempia Summerfield Katz LLC

(57) ABSTRACT

A rotating multi-variant luggage tray structure is proposed. The structure includes a cover part formed at a position corresponding to an inner surface of a trim, a housing rotated about a rotating shaft to be withdrawn from the trim, and a rotating bellows connected to the housing and configured to be folded according to a rotational radius of the housing. The cover part may be rotated about the rotating shaft to be opened, and then be longitudinally extended.

7 Claims, 4 Drawing Sheets

(56) References Cited

U.S. PATENT DOCUMENTS

2017/0313257 A1\* 11/2017 Kang ..................... B60R 7/046
2018/0118119 A1    5/2018 Na
2020/0324705 A1\* 10/2020 Lee .......................... B60R 7/02
2020/0324706 A1\* 10/2020 Cho .......................... B60R 7/04

FOREIGN PATENT DOCUMENTS

| KR | 200362308 Y1 | 9/2004 |
| KR | 101476617 B1 | 12/2014 |
| KR | 20180048161 A | 5/2018 |
| KR | 20200121397 A | 10/2020 |

\* cited by examiner

[ Side View ]

ROTATING MULTI-VARIANT LUGGAGE TRAY STRUCTURE

CROSS REFERENCE TO RELATED APPLICATION

This application claims priority to and the benefit of Korean Patent Application No. 10-2021-0168134, filed Nov. 30, 2021, the entire contents of which are incorporated herein by reference.

BACKGROUND

Field

The present disclosure relates to a rotating multi-variant luggage tray structure. More particularly, the present disclosure relates to a rotating multi-variant luggage tray structure, which can expand a storage space and simultaneously can make better use of an interior space of a trim.

Description of the Related Art

Generally, a luggage room is provided behind a rear seat of a hatchback vehicle, such as a passenger car or a sport utility vehicle (SUV), to load various kinds of cargo. The luggage room defines a space to load cargo by luggage trims positioned on the left and right with respect to the rear seat, a floor panel provided at the rear of each luggage trim, and a transverse trim protruding to a predetermined height.

Moreover, a luggage board is installed in the luggage room to be provided at the same height as the top end of the transverse trim by a support structure and a guide structure formed on the luggage trim and to divide the luggage room into upper and lower spaces and thereby allow cargo to be stored according to a purpose and a size. That is, the conventional luggage board for the vehicle is proposed to store various sizes of cargo in the luggage room. A support structure and a guide structure are made on the luggage trim to be mounted on upper and lower ends thereof. Generally, the luggage board of the vehicle is installed between a seat in a rearmost row and a rear window or a trunk to place light personal items or a box of tissues thereon or mount a speaker thereon.

When the speaker is built in a side part of the vehicle, a space between the vehicle body and the luggage trim is reduced, thus resulting in a reduction in storage space. We have discovered that if the speaker is positioned in a film exciter, a space between the luggage and the vehicle body may be used as a storage space. To this end, a suitable storage tray is required.

The foregoing is intended merely to aid in the understanding of the background of the present disclosure, and is not intended to mean that the present disclosure falls within the purview of the related art that is already known to those having ordinary skill in the art.

SUMMARY

The present disclosure provides a rotating multi-variant luggage tray structure, which can expand a storage space with a bellows structure connected to a housing which is rotatable to be withdrawn.

Further, the present disclosure provides a rotating multi-variant luggage tray structure, which can make better use of an interior space of a trim by applying an extendable cover part.

The objectives of the present disclosure are not limited to the above-mentioned objectives, and other objectives of the present disclosure not mentioned may be understood by the following description, and may become more apparent by embodiments of the present disclosure. Further, the objectives of the present disclosure may be realized by means described in claims and combinations thereof.

In one embodiment of the present disclosure, a rotating multi-variant luggage tray structure includes: a cover part formed at a position corresponding to an inner surface of a trim; a housing configured to rotate about a rotating shaft to be withdrawn from the trim; and a rotating bellows connected to the housing. The rotating bellows is configured to be folded according to a rotational radius of the housing. The cover part may be rotated about the rotating shaft to be opened, and then be longitudinally extended.

In one embodiment, the cover part may include a first cover secured to the housing; a second cover formed at a position corresponding to the first cover and configured to move longitudinally along the trim; a folding part forming at least a surface of each of the first and second covers when the second cover is longitudinally moved; and a base part positioned on the first cover or the second cover and deployed to a floor to form a floor surface when the second cover is longitudinally extended.

The rotating bellows may be compressed in a state where the cover part is held on the inner surface of the trim.

The folding part may be configured to be folded inwards when the first cover and the second cover come into contact with each other.

In one embodiment, the rotating multi-variant luggage tray structure may further include a magnet positioned on an upper portion of the first cover or the second cover; and a touch fastener formed on the base part. In particular, the first cover and the second cover may be configured to contact with each other via the magnet.

In another embodiment, the rotating multi-variant luggage tray structure may further include a screen part fastened to an upper surface of the housing and configured to move downwards in a height direction to separate an interior storage space of the housing.

The present disclosure may achieve the following effects by a configuration, combination, and use relationship described below along with the above-described embodiment.

The present disclosure is advantageous in that it can expand a storage space with a bellows structure connected to a housing which is rotatable to be withdrawn, and can maximally utilize a space between a luggage and a vehicle body.

Further, the present disclosure is advantageous in that it can make better use of an interior space of a trim by applying an extendable cover part.

BRIEF DESCRIPTION OF THE DRAWINGS

The above and other objectives, features, and other advantages of the present disclosure are more clearly understood from the following detailed description when taken in conjoint with the accompanying drawings, in which.

Figure 1:
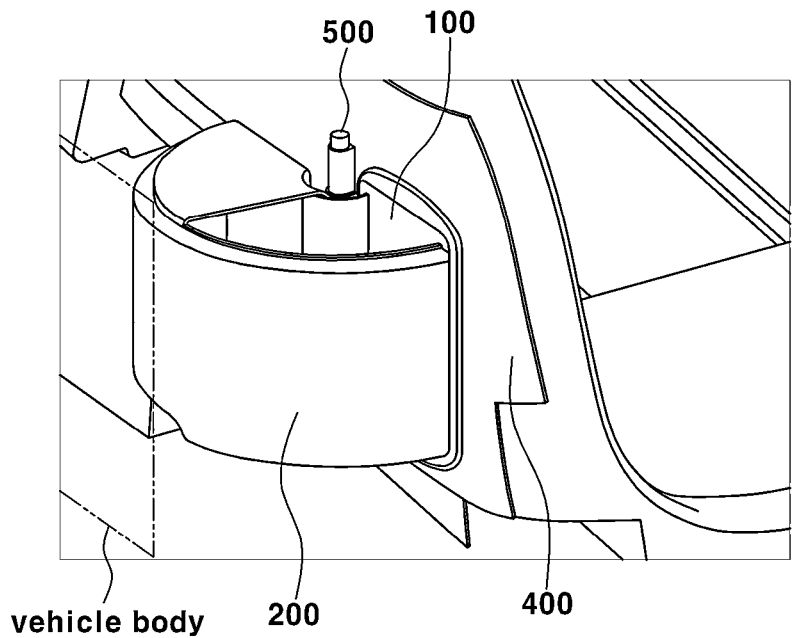
FIG. 1 is a perspective view illustrating a rotating multi-variant luggage tray structure seen from an outside of a trim, according to an embodiment of the present disclosure.

The drawings described herein are for illustration purposes only and are not intended to limit the scope of the present disclosure in any way.

DETAILED DESCRIPTION OF THE PRESENT DISCLOSURE

Hereinafter, embodiments of the present disclosure are described in detail with reference to the accompanying drawings. Embodiments of the present disclosure may be changed in various forms, and the scope of the present disclosure should not be construed as being limited to the following embodiments. This embodiment is provided to make those of ordinary skill in the art fully understand the present disclosure.

Further, terms such as " . . . part" and " . . . member" described in the specification mean a unit for processing at least one function or operation, which may be implemented by hardware or a combination of hardware.

When a component, device, element, or the like of the present disclosure is described as having a purpose or performing an operation, function, or the like, the component, device, or element should be considered herein as being "configured to" meet that purpose or to perform that operation or function.

Herein, "height direction", "width direction", and "length direction" are designated on the basis of a vehicle.

Further, herein, it should be understood that terms "first" or "second" are only used to distinguish one component from another component. The following description is not necessarily limited to this order.

Furthermore, it should be understood that when a component is referred to as being "on" or "above" another component, it may be "directly on" another component or an intervening component may be present therebetween. In addition, it should be understood that when a component is referred to as being "under" or "below" another component, it may be "directly under" another component or an intervening component may be present therebetween.

As used herein, the term "top" means a direction moving to the top in the height direction of the drawing, while the term "bottom" means a direction moving to the bottom in the height direction of the drawing.

Figure 2:
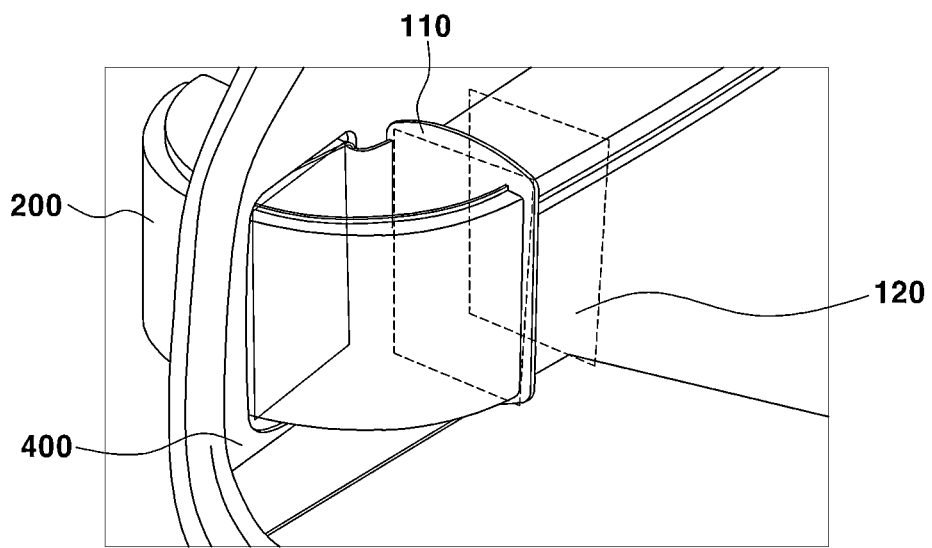
FIG. 2 is a perspective view illustrating the rotating multi-variant luggage tray structure seen from an inside of the trim when a housing is rotatably withdrawn and then a cover part is extended, according to an embodiment of the present disclosure.

FIG. 1 is a perspective view illustrating a rotating multi-variant luggage tray structure seen from an outside of a trim, according to an embodiment of the present disclosure, and FIG. 2 is a perspective view illustrating the rotating multi-variant luggage tray structure seen from an inside of the trim when a housing is rotatably withdrawn and then a cover part is extended, according to an embodiment of the present disclosure.

Referring to FIGS. 1 and 2, the rotating multi-variant luggage tray structure may include a cover part 100, a housing 200, and a rotating bellows 300. In one embodiment, the cover part 100 may be rotated about the rotating shaft 500 to be opened, and the housing 200 may be rotated about the rotating shaft 500 to be withdrawn.

The cover part 100 may be formed at a position corresponding to the inner surface of the trim 400 in a state where the cover part is held on the trim 400. In another embodiment, the cover part 100 may be held in an opening formed in the trim 400. The cover part 100 may be formed at a position corresponding to the inner surface of the trim 400 in a state where it is held on the trim 400. In a state where the cover part 100 is not rotated to be opened, the cover part 100 may be configured to be adjacent to the inner surface of the trim 400.

The cover part 100 may be configured to be longitudinally extended after it is rotated about the rotating shaft 500. In one embodiment, the cover part 100 may be rotated from the inner surface of the trim 400 to the interior space of a luggage room to be opened. After the cover part 100 is rotated to be opened, the cover part may be longitudinally extended to define a storage space. In an embodiment, the cover part 100 may be longitudinally extended after it is rotated at 90 degrees about the rotating shaft 500 from the inner surface of the trim 400 to the interior space of the luggage room.

The cover part 100 may include a first cover 110, a second cover 120, a folding part 130, and a base part 140. The first cover 110 may be secured to the housing 200. In another embodiment, the first cover 110 is secured to the housing 200, so the first cover 110 may be rotated to be opened when the housing 200 is rotated to be withdrawn. The second cover 120 may be formed at a position corresponding to the first cover 110. In one embodiment, the second cover 120 may be formed in a shape corresponding to that of the first cover 110, so the second cover 120 may be in surface contact with the first cover 110.

The second cover 120 may be configured to move longitudinally along the trim 400. In another embodiment, the second cover 120 may be configured to move longitudinally along the inner surface of the trim 400 while being spaced apart from the first cover 110. The folding part 130 may be configured to form the side surfaces of the first cover 110 and the second cover 120 when the second cover 120 moves longitudinally. When the second cover 120 moves longitudinally, so the folding part 130 is fully extended, the base part 140 may be deployed to a floor to form a floor surface.

The housing 200 may be rotated about the rotating shaft 500 to be withdrawn from the trim 400. In one embodiment, the housing 200 may be positioned in a space between a vehicle body and the trim 400, and then at least a portion thereof may be withdrawn to the interior space of the luggage room.

In an embodiment, the housing 200 may be configured in the shape of a semicircle which rotates about the rotating shaft 500. In another embodiment, the housing 200 may be configured in the shape of the semicircle having a storage space therein. The upper surface of the housing 200 may be configured such that at least a portion thereof is opened.

The housing 200 may be configured to rotate about the rotating shaft 500 positioned on a side of the trim 400 in a state where the housing is positioned between the vehicle body and the trim 400. The housing 200 may be rotated to be withdrawn through the opening of the trim 400 to the interior space of the luggage room. In an embodiment, as shown in FIG. 2, the housing 200 may be rotated at 90 degrees about the rotating shaft 500 to be withdrawn. In this case, a fixing member may be further included so that the housing 200 is fixed in a state where it is rotated at 90 degrees to be withdrawn.

The housing 200 may be rotated to be withdrawn to the interior space of the luggage room, thus forming the storage space. In an embodiment, when the housing 200 is rotated at 90 degrees to be withdrawn, the interior storage space of the luggage room may be formed in a fan shape. A portion of the upper surface of the housing 200 may be opened to form the fan-shaped storage space on the inner surface of the trim 400.

The rotating bellows 300 may be connected to the housing 200, and may be configured to be folded according to the rotational radius of the housing 200. In one embodiment, a first side surface of the rotating bellows 300 may be in surface contact with the housing 200, and a second side surface thereof may be in surface contact with the trim 400. The rotating bellows 300 may be unfolded when the housing 200 is rotated to be withdrawn.

One side surface of the rotating bellows 300 may be configured to be connectable to the housing 200. In one embodiment, when the rotating bellows 300 is unfolded, the rotating bellows may be connected to the housing 200 to form the storage space. In an embodiment, when the housing 200 is rotated at 90 degrees to be withdrawn, the rotating bellows 300 and the housing 200 may be configured to form a sealed storage space in the vehicle body and the interior space of the trim 400.

Figure 3:
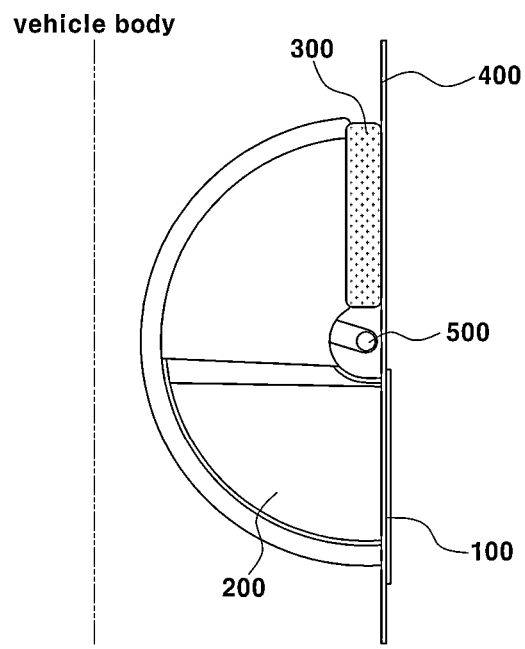
FIG. 3 is a plan view illustrating a state before the cover part of the rotating multi-variant luggage tray structure is rotated and opened, according to an embodiment of the present disclosure.
Figure 4:
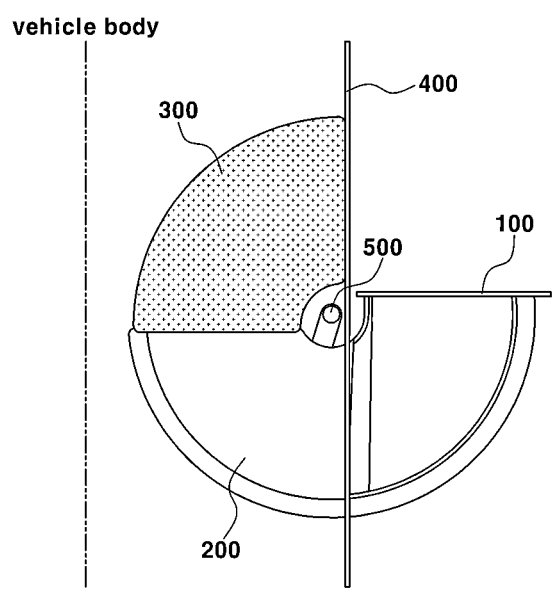
FIG. 4 is a plan view illustrating a state after the cover part of the rotating multi-variant luggage tray structure is rotated and opened, according to an embodiment of the present disclosure.

FIG. 3 is a plan view illustrating a state before the cover part 100 of the rotating multi-variant luggage tray structure is rotated and opened, according to an embodiment of the present disclosure. FIG. 4 is a plan view illustrating a state after the cover part 100 of the rotating multi-variant luggage tray structure is rotated and opened, according to an embodiment of the present disclosure.

Referring to FIGS. 3 and 4, the rotating bellows 300 may be compressed in a state where the cover part 100 is held on the inner surface of the trim 400. In one embodiment, in a state where the cover part 100 is held on the inner surface of the trim 400, the second side surface of the rotating bellows 300 may be supported on the outer surface of the trim 400, and the first side surface of the rotating bellows 300 may be compressed by the housing 200. When a separate storage space is not required in the luggage room, the housing 200 may be positioned in a space between the vehicle body and the trim 400.

The rotating bellows 300 may be configured to be unfolded in the compressed state when the cover part 100 is rotated to be opened. In another embodiment, the rotating bellows 300 may be configured to be unfolded according to the rotating angle of the cover part 100. In an embodiment, when the rotating angle of the cover part 100 is 90 degrees, the rotating bellows 300 may be unfolded to the maximum.

Thus, a portion of the housing 200 connected to the rotating bellows 300 may form the sealed storage space in the space between the vehicle body and the trim 400.

The rotating bellows 300 may be made of a rubber material to have a folded structure. In one embodiment, the material of the rotating bellows 300 may include at least one of styrene butadien rubber (SBR), polychloroprene rubber (CR), acrylonitrile-butadiene rubber (NBR), isoprene-isobutylene rubber (IIR), butadiene rubber (BR), isoprene rubber (IR), ethylene propylene rubber (EPR), polysulfide rubber, silicone rubber, fluororubber, urethane rubber, or acrylic rubber.

In FIG. 4, the upper surface of the housing 200, which is withdrawn into the trim 400, may be opened to form the storage space of the luggage room. A user may rotate and withdraw the housing 200 to provide a required storage space, and then may fix the housing 200 to the trim 400 at a desired angle.

Figure 5:
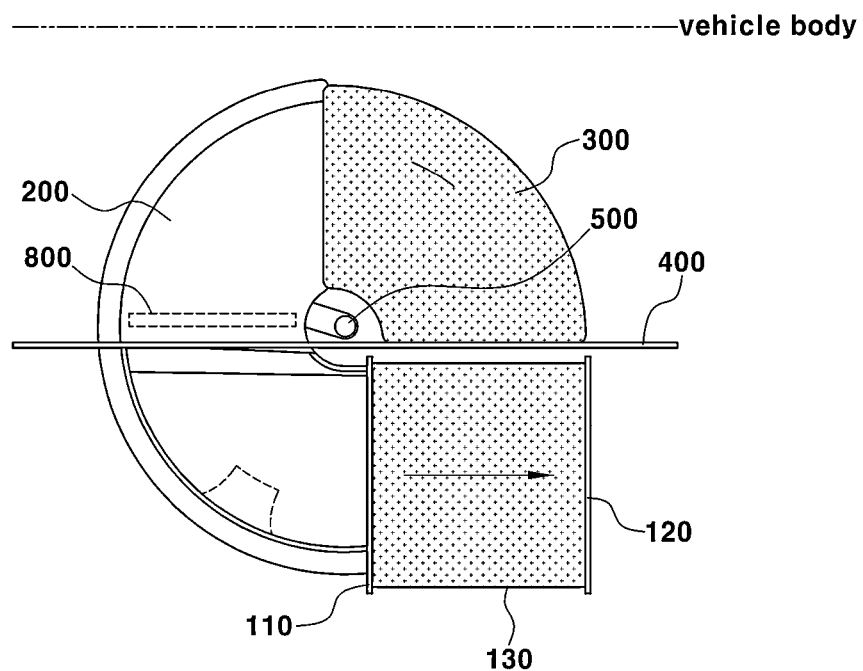
FIG. 5 is a plan view illustrating a state in which the cover part of the rotating multi-variant luggage tray structure is longitudinally extended, according to an embodiment of the present disclosure.

FIG. 5 is a plan view illustrating a state in which the cover part 100 of the rotating multi-variant luggage tray structure is longitudinally extended, according to an embodiment of the present disclosure.

Referring to FIG. 5, the cover part 100 may be configured to be rotated about the rotating shaft 500 to be opened and then be longitudinally extended. The structure may further include a screen part 800 which is fastened to the upper surface of the housing 200. The screen part 800 may descend in the height direction and thus separate the interior storage space of the housing 200.

In an embodiment, the cover part 100 may be rotated at 90 degrees to be opened and then the second cover 120 is longitudinally moved to extend the interior storage space of the luggage room. The upper surface of the housing 200 positioned inside the trim 400 may be configured to be opened. Further, the upper surface between the first cover 110 and the second cover 120 may be configured to be opened. Thereby, the cover part may be configured to store an item which is longer in length than the housing 200 in a height direction in the luggage room. On the other hand, a hook may be formed on an inner wall of the housing 200 so that the item is fixed so as not to move.

The screen part 800 may be fastened to the upper surface of the housing 200. In one embodiment, when the housing 200 is rotated to be withdrawn, the screen part 800 may be fastened to the upper surface of the housing 200 positioned in the space between the vehicle body and the trim 400. The screen part 800 may be configured to descend in the height direction and thereby separate the interior storage space of the housing 200. The screen part 800 may be configured to separate the storage space between the vehicle body and the trim 400 from the interior storage space of the luggage room when the housing 200 is rotated to be withdrawn. Thereby, the storage space between the vehicle body and the trim 400 may maintain a sealed state.

Figure 6:
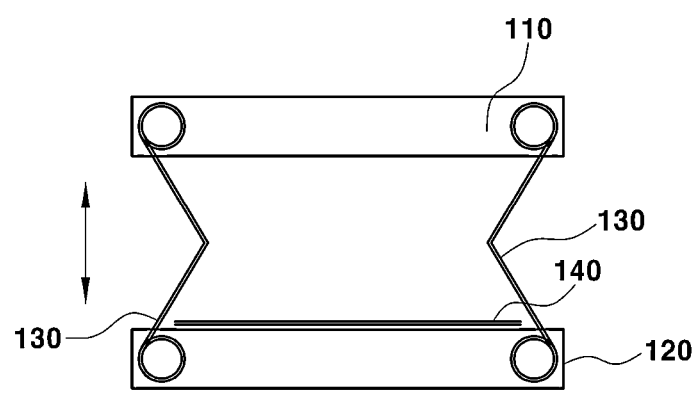
FIG. 6 is a plan view illustrating a process in which the cover part of the rotating multi-variant luggage tray structure is being extended, according to an embodiment of the present disclosure.
Figure 7:
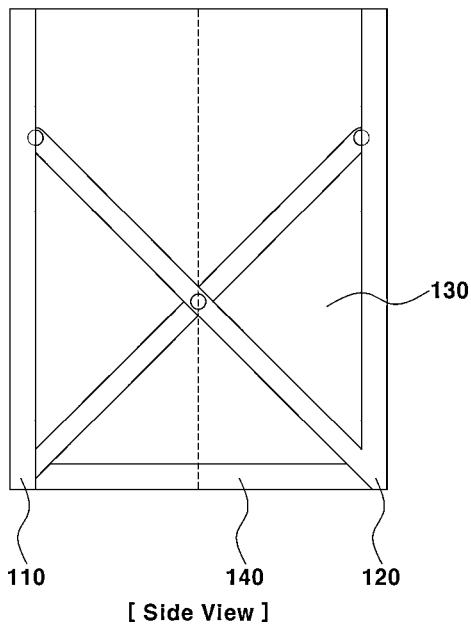
FIG. 7 is a side view of a support structure when the cover part of the rotating multi-variant luggage tray structure is fully extended, according to an embodiment of the present disclosure.

FIG. 6 is a plan view illustrating a process in which the cover part 100 of the rotating multi-variant luggage tray structure is being extended, according to an embodiment of the present disclosure. FIG. 7 is a side view of a support structure when the cover part 100 of the rotating multi-variant luggage tray structure is fully extended, according to an embodiment of the present disclosure.

Referring to FIGS. 6 and 7, the folding part 130 may be folded inwards when the first cover 110 and the second cover 120 come into contact with each other. In one embodiment, the folding part 130 may have a hinge shaft arranged in the height direction. The folding part 130 is configured to be folded inwards about the hinge shaft, thus allowing the first cover 110 and the second cover 120 to contact with each other without interference. The folding part 130 may be configured to form the side surface forming the space between the first cover 110 and the second cover 120 when the second cover 120 is completely moved in the longitudinal direction. When the folding part 130 is completely unfolded, the space between the first cover 110 and the second cover 120 may define the storage space of the luggage room.

In an embodiment of the present disclosure, in a state where the folding part 130 is fully extended, a support structure for supporting the storage space may be formed. The support structure may be fastened to first ends of the first cover 110 and the second cover 120, and may be connected to the first ends of the first cover 110 and the second cover 120. Thus, as the folding part 130 is folded, the support structure connected to the first ends of the first cover 110 and the second cover 120 may be configured to move upwards. When the folding part 130 is extended, a first end of the support structure may move downwards along the first cover 110 and the second cover 120.

Figure 8:
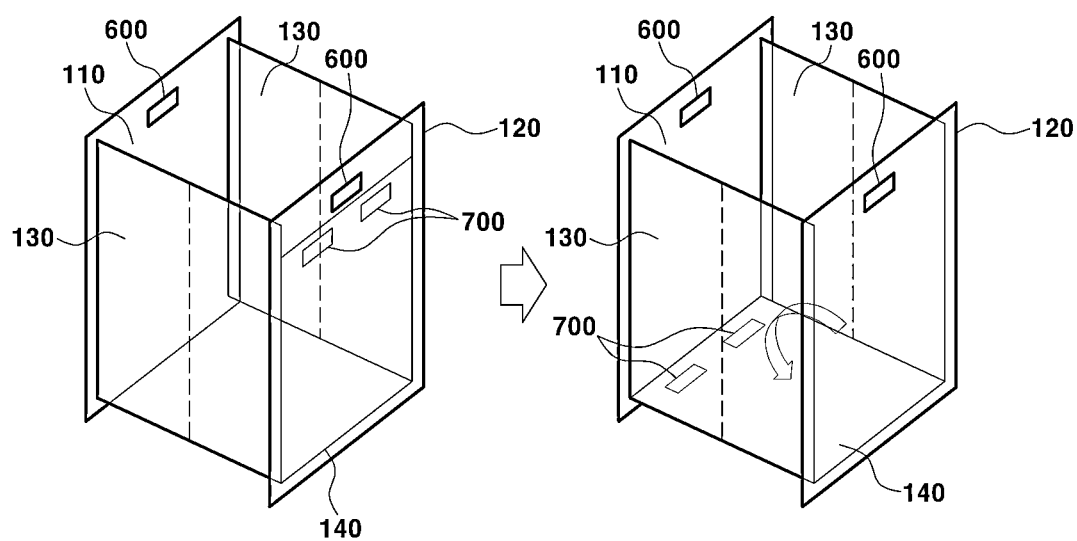
FIG. 8 are perspective views illustrating a state in which a base part is rotated when the cover part of the rotating multi-variant luggage tray structure is extended, according to an embodiment of the present disclosure.

FIG. 8 are perspective views illustrating a state in which the base part 140 is rotated when the cover part 100 of the rotating multi-variant luggage tray structure is extended, according to an embodiment of the present disclosure.

The base part 140 may be configured to be positioned on the first cover 110 or the second cover 120. In another embodiment, the base part 140 may be deployed to the floor to form the floor surface in a state where the second cover 120 is fully extended in a longitudinal direction.

In an embodiment, when the second cover 120 is not fully extended in the longitudinal direction, a first end of the base part 140 may be fastened to a lower portion of the second cover 120 and a second end thereof may be positioned on an upper portion of the second cover 120, so the base part may be maintained while being in contact with an inner surface of the second cover 120. The base part 140 may be configured such that the second end is rotated about the first end as a hinge point.

An embodiment of the present disclosure may further include a touch fastener 700 formed on the base part 140. Further, a groove is formed on the second end of the base part 140. Thus, when a user inserts his or her finger into the groove to pull the base part 140, the touch fastener 700 may be detachably attached.

An embodiment of the present disclosure may be configured to further include a magnet 600 positioned on an upper portion of the first cover 110 or the second cover 120. In an embodiment, the magnet 600 may comprise a pair of magnets at corresponding positions of the first cover 110 and the second cover 120. In a state where the second cover 120 is not longitudinally extended, the first cover 110 and the second cover 120 may be configured to contact with each other via the magnet 600.

As discussed above, the present disclosure provides a rotating multi-variant luggage tray structure which can expand a storage space with a bellows structure connected to a housing 200 which is rotatable to be withdrawn. The present disclosure provides a better use of an interior space of a trim 400 by applying an extendable cover part 100.

The above detailed description is illustrative of the present disclosure. Further, the foregoing has shown and described embodiments of the present disclosure, and the present disclosure can be used in various other combinations, modifications, and environments. In other words, the present disclosure may be changed and modified within the scope of the concept of the present disclosure described herein, the scope equivalent to the disclosure, and/or the scope of the skill or knowledge in the art. The embodiment describes the best mode for implementing the technical idea of the present disclosure, and various changes are possible in a specific application field and use of the present disclosure. Therefore, the detailed description of the present disclosure is not intended to limit the present disclosure to the above-described embodiment. Further, the appended claims should be construed to cover other embodiments.

What is claimed is:

1. A rotating multi-variant luggage tray structure comprising:
   a cover part formed at a position corresponding to an inner surface of a trim;
   a housing rotatable about a rotating shaft to be withdrawn from the trim; and
   a rotating bellows connected to the housing, and configured to be folded according to a rotational radius of the housing,
   wherein the cover part comprises:
      a first cover secured to the housing;
      a second cover formed at a position corresponding to the first cover, and configured to move longitudinally along the trim; and
      a folding part forming at least a surface of each of the first and second covers when the second cover is longitudinally moved.

2. The rotating multi-variant luggage tray structure of claim 1, wherein the rotating bellows is compressed in a state where the cover part is held on the inner surface of the trim.

3. The rotating multi-variant luggage tray structure of claim 1, wherein the folding part is configured to be folded inwards when the first cover and the second cover come into contact with each other.

4. The rotating multi-variant luggage tray structure of claim 1, further comprising:
   a magnet positioned on an upper portion of the first cover or the second cover; and
   a touch fastener formed on a base part,
   wherein the first cover and the second cover are configured to contact with each other via the magnet.

5. The rotating multi-variant luggage tray structure of claim 1, further comprising:
a screen part fastened to an upper surface of the housing, and configured to move downwards in a height direction to separate an interior storage space of the housing.

6. A rotating multi-variant luggage tray structure comprising:
   a cover part formed at a position corresponding to an inner surface of a trim;
   a housing rotatable about a rotating shaft to be withdrawn from the trim; and
   a rotating bellows connected to the housing, and configured to be folded according to a rotational radius of the housing,
   wherein the cover part is rotated about the rotating shaft to be opened and then is longitudinally extended.

7. The rotating multi-variant luggage tray structure of claim 1, further comprising:
   a base part positioned on the first cover or the second cover, and configured to be deployed to a floor to form a floor surface when the second cover is longitudinally extended.

* * * * *